United States Patent
Srinivasaraghavan et al.

(10) Patent No.: US 12,309,209 B2
(45) Date of Patent: May 20, 2025

(54) WEB CONFERENCING EXIT AND POST-EXIT CONTENT GENERATION

(71) Applicant: ADOBE INC., San Jose, CA (US)

(72) Inventors: Ramesh Srinivasaraghavan, Bangalore (IN); Naveen Prakash Goel, Uttar Pradesh (IN); Gokul Krishna Paravasthu, Bangalore (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/131,184

(22) Filed: Apr. 5, 2023

(65) Prior Publication Data

US 2024/0340321 A1    Oct. 10, 2024

(51) Int. Cl.
| | |
|---|---|
| H04L 29/06 | (2006.01) |
| G06F 15/08 | (2006.01) |
| G06F 16/23 | (2019.01) |
| G06F 16/93 | (2019.01) |
| G06F 21/45 | (2013.01) |
| H04L 12/18 | (2006.01) |
| H04L 65/1069 | (2022.01) |
| H04L 65/401 | (2022.01) |

(52) U.S. Cl.
CPC ...... *H04L 65/1069* (2013.01); *H04L 12/1831* (2013.01); *H04L 65/401* (2022.05)

(58) Field of Classification Search
CPC .............. H04L 65/403; H04L 65/1069; H04L 12/1831; H04L 65/401
See application file for complete search history.

(56) References Cited

U.S. PATENT DOCUMENTS

| | | | | |
|---|---|---|---|---|
| 6,674,459 B2* | 1/2004 | Ben-Shachar | ......... | H04N 7/152 |
| | | | | 348/14.09 |
| 8,756,501 B1* | 6/2014 | Karam | .................... | G06F 3/048 |
| | | | | 715/764 |
| 8,874,648 B2* | 10/2014 | Beerse | .................... | G06Q 10/00 |
| | | | | 709/204 |
| 9,002,938 B2* | 4/2015 | Bank | .................... | H04L 12/1822 |
| | | | | 709/204 |
| 9,286,309 B2* | 3/2016 | Goel | ....................... | G06F 40/14 |
| 9,813,461 B2* | 11/2017 | Ouyang | ................ | H04L 65/765 |
| 9,824,333 B2* | 11/2017 | Shaw | .................... | G06Q 10/109 |
| 10,110,645 B2* | 10/2018 | Bader-Natal | ............ | H04N 7/15 |
| 10,193,849 B2* | 1/2019 | Klein | ....................... | H04L 51/52 |
| 10,505,998 B1* | 12/2019 | Ackerman | .......... | H04L 65/4025 |
| 11,374,911 B1* | 6/2022 | Krohn | ................... | H04L 63/104 |

(Continued)

*Primary Examiner* — Jason D Recek
*Assistant Examiner* — Golam Mahmud
(74) *Attorney, Agent, or Firm* — Shook Hardy & Bacon L.L.P.

(57) ABSTRACT

Systems and methods dynamically generate tailored exit and post-exit content for web conferences. During presentation of conference content for a web conference, metadata is stored for one or more participant interactions with the web conference via a web conferencing client on a user device. Data associated with an exit from the web conference for the web conferencing client is received. Responsive to the data associated with the exit from the web conference, content is generated based on an exit context determined at least in part on the metadata regarding the one or more participant interactions. The generated content is provided for presentation on the user device.

16 Claims, 7 Drawing Sheets

(56) References Cited

U.S. PATENT DOCUMENTS

| | | | | |
|---|---|---|---|---|
| 2004/0003046 | A1* | 1/2004 | Grabelsky | H04L 65/1101 709/227 |
| 2008/0126949 | A1* | 5/2008 | Sharma | G06Q 10/109 715/751 |
| 2012/0182384 | A1* | 7/2012 | Anderson | H04N 7/157 348/14.09 |
| 2020/0403817 | A1* | 12/2020 | Daredia | G06F 16/483 |
| 2021/0092168 | A1* | 3/2021 | Ranalli | H04M 3/567 |
| 2021/0400142 | A1* | 12/2021 | Jorasch | H04L 65/1069 |
| 2022/0014571 | A1* | 1/2022 | Polish | H04L 65/1069 |
| 2023/0007063 | A1* | 1/2023 | Gupta | H04L 65/1069 |
| 2023/0013497 | A1* | 1/2023 | Aher | G06F 3/165 |
| 2023/0188509 | A1* | 6/2023 | Artemov | H04L 63/06 713/168 |
| 2023/0230595 | A1* | 7/2023 | Baird | H04L 12/1831 704/235 |

* cited by examiner

200

202 — Thanks for taking time to checking out our webinar today. We understand you want to leave the session now and have some important work to attend to. If you could spare another 5 minutes, you can get a quick overview of what will be covered today in a personalized breakout room.

204 — Are you interested? [Yes] [No]

302 — Thank you, Ramesh for attending the webinar. Hope you found the information shared so far useful. We understand you want to leave the session now. Here is a quick summary of the key takeaways based on what you have heard so far.

1) Topic 1
    2) Topic 2
    3) Topic 3

304 — In case you are willing to stay a bit longer you will:

a) See a demo of upcoming new features
    b) Get a sense of aggregate feedback from all attendees after the demo 306 — Would you like to stay for some more time? [Yes] [No]

*FIG. 3.*

WEB CONFERENCING EXIT AND POST-EXIT CONTENT GENERATION

BACKGROUND

Web conferencing systems allow client devices at remote locations to communicate over a network and share electronic content, such as electronic documents and web content. Web conferences can be used, for instance, to conduct meetings and training events, or present lectures and presentations from any computing device accessing a web conference. Web conference applications allow for online collaboration via webinars, interactive conferences, online workshops, web meetings, eLearning sessions, etc. Web conferences also often support communication among participants via text message, video chat, and audio chat.

SUMMARY

Some aspects of the present technology relate to, among other things, a web conferencing system that dynamically generates exit and/or post-exit content based on an exit context of a participant exiting a web conference. In accordance with some aspects, the web conferencing system tracks data during a web conference. The tracked data includes conference content shared during the web conference and participant interactions during the web conference. An exit input associated with the web conferencing client of a participant is received during the web conference (or at the termination of the web conference, in some instances). An exit context for the participant is determined. The exit context can be based on, for instance, a time of exit, participant interactions during the web conference, and/or user profile information for the participant. For instance, the time of exit can be used to determine conference content presented while the participant was connected to the web conference and/or conference content not presented while the participant was connected to the web conference. The participant interactions and/or user profile information for the participant can be used to determine conference content of interest to the participant and/or, more generally, topics of interest to the participant. Exit content and/or post-exit content is generated based on the exit context and provided for presentation on a user device of the participant.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 2 is a screen display illustrating an exit message inviting a participant to a breakout session in accordance with some implementations of the present disclosure;

FIG. 3 is a screen display illustrating exit content generated based on an exit context for a participant in accordance with some implementations of the present disclosure;

DETAILED DESCRIPTION

Definitions

Figure 1:
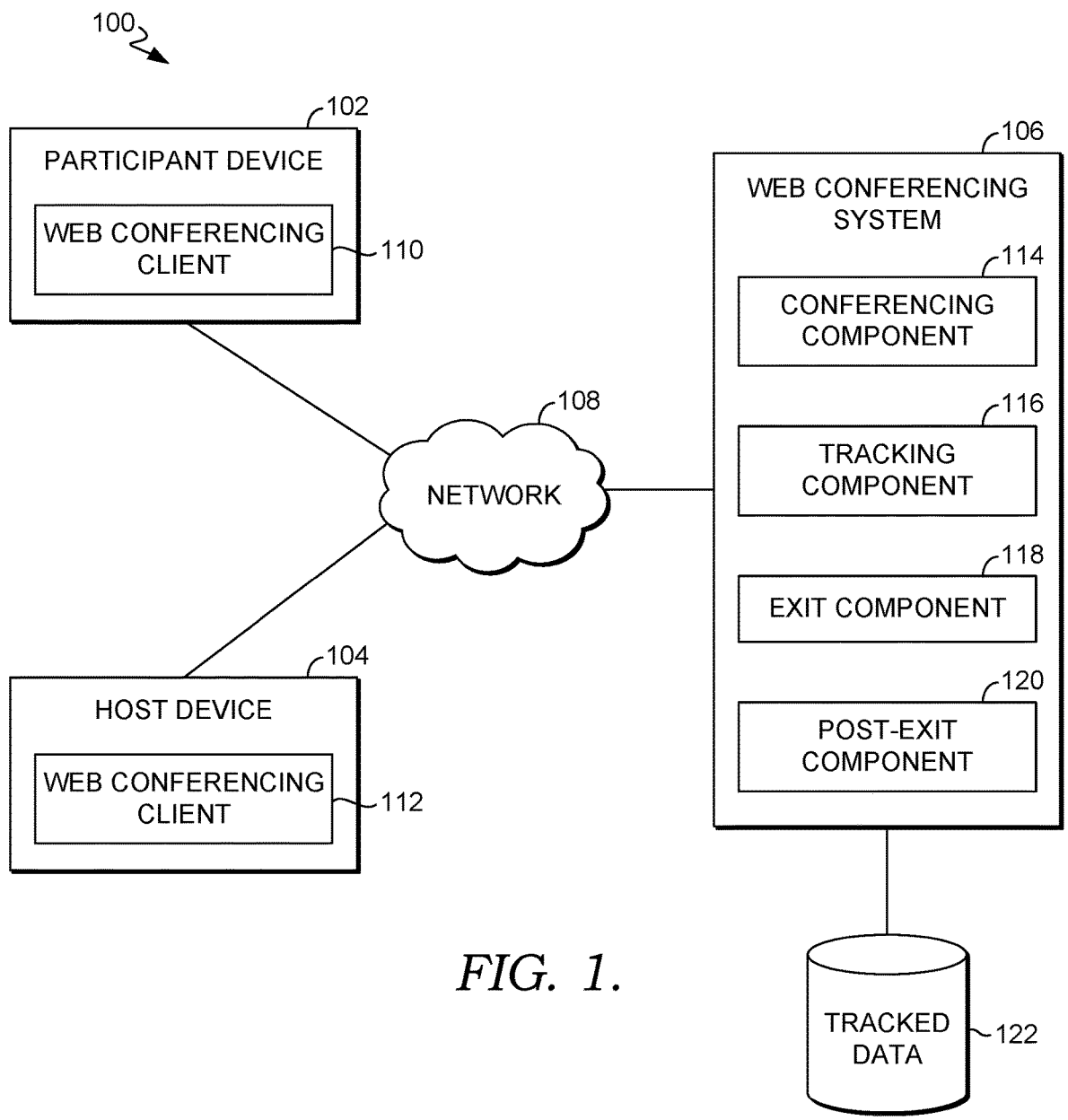
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, a "web conference" refers to a network-based meeting in which participants communicate with one another in real-time over the Internet. For instance, a web conference can be a webinar, webcast, web meeting, online collaboration, or online presentation. In some instances, a web conference includes one or more host participants that facilitate the web conference, for instance, by presenting content during the web conference (i.e., acting as a presenter) and/or controlling certain aspects of the web conference. A web conference is enabled by a web conferencing system in which user devices join the web conference via web conferencing clients on the user devices that facilitate live-sharing of content and other functions of the web conference.

"Conference content" refers to content shared among at least a portion of participants during a web conference. Conference content comprises, for instance, video-based, audio-based, and text-based content distributed to user devices via web conferencing clients on the user devices during a web conference. By way of specific examples, conference content includes slide presentations, presenter notes, audio, video, polls, poll responses, chat content (text, audio, and/or video-based), shared documents, whiteboarding content, and reactions.

As used herein, "participant interactions" refer to any interactions by a participant with a web conference via the web conferencing client on the participant's user device. By way of example, participant interactions include joining a web conference, responding to polls, submitting chat content, sharing documents, speaking, and selecting hyperlinks from conference content.

"Tracked data" is used herein to refer to information regarding conference content shared during a web conference and participant interactions during the web conference. In some instances, tracked data includes conference content itself (e.g., a recording of the web conference, shared document, poll responses, etc.). In some instances, tracked data includes metadata regarding conference content and participant interactions. The metadata can include, for instance, a timestamp identifying a point in time along a web conference's timeline in which conference content was shared or a participant interaction occurred. The metadata can further include one or more identifiers, such as for instance, a web conference identifier identifying the web conference, a breakout session identifier identifying a breakout session (e.g., a breakout room), a host identifier identifying a host, a participant identifier identifying a participant, a conference content identifier identifying particular conference content, and a participant interaction identifier identifying a particular participant interaction.

An "exit" refers to a point in time along the timeline of a web conference in which a participant selects to disconnect the participant's user device from the web conference or the participant's user device is otherwise disconnected (e.g., at the end of the web conference).

An "exit context" refers to a collection of information regarding a participant's exit from a web conference. The exit context for a participant comprises, for instance, conference content consumed by the participant (e.g., presented via the web conferencing client on the participant's user device), conference content not consumed by the participant (e.g., conference content presented/to be presented after the participant's exit), participant interactions by the participant, and/or user profile information regarding the participant (e.g., general information regarding the participant, such as demographics, job title, company, etc.).

"Exit content" refers to content that is generated based on an exit context for a participant when the participant selects to exit from a web conference but before the participant's user device is disconnected from the web conference.

"Post-exit" content refers to content that is generated based on an exit context for a participant after the participant's user device is disconnected from the web conference.

Overview

While web conferencing systems are useful for a variety of collaborative applications, they fall short in providing engagement once a web conference has concluded or a participant has otherwise exited the web conference. Conventional solutions to provide conference-related content to a participant that has left a web conference is often passive in nature. For instance, a link is sometimes provided to a participant that allows the participant to access a recording of the web conference. In some cases, a survey is provided to collect information from participants. In some cases, an interactive recording of the web conference is provided that can be segmented into chapters. However, the participant may not recall when they exited and not have a good idea of what portions to view. These conventional approaches are generic and not tailored per participant. Additionally, these approaches fail to consider whether a participant had fully attended the session or had exited the web conference before completion and the degree of the participant's engagement during their participation in the web conference.

Aspects of the technology described herein improve the functioning of the computer itself in light of these shortcomings in existing technologies by providing a web conferencing system that dynamically generates an exit and/or post-exit experience for a participant based on an exit context of the participant exiting from a web conference.

In accordance with some aspects of the technology described herein, data is tracked during a web conference. The tracked data includes conference content shared during the web conference. The tracked data also includes data regarding participant interactions during the web conference. Among other things, the tracked data stores metadata for the conference content and participant interactions. In some aspects, the metadata for each conference content and participant interaction includes a timestamp along a timeline of the web conference for the conference content or participant interaction. In some aspects, the metadata for each conference content and participant interaction also includes one or more identifiers to identify, for instance, the web conference, participant, conference content, and/or participant interaction. In some configurations, the web conferencing system also stores conference content (e.g., a recording of the web conference, shared documents, poll responses, etc.) and/or content associated with a participant interaction (e.g., shared document, chat entry, etc.).

An exit input is received for a web conferencing client of a participant. In some cases, this could be user input from the participant to exit the web conference before the web conference has ended. In other cases, this could be the termination of the web conference. An exit context is determined for the participant based on the time of exit, participant interactions tracked for the participant, and/or user profile information (e.g., demographics, job title, company, etc.) for the participant. The time of exit is used by the web conferencing system to determine conference content presented by the web conferencing client of the participant before the exit and/or conference content not presented before the exit (e.g., conference content to be presented after the exit based on pre-determined conference content such as a slide presentation; and/or conference content actually presented as part of the conference after the exit). The participant interactions and/or user profile information are used by the web conferencing system to determine conference content of interest to the participant and/or, more generally, topics of interest to the participant.

Exit content and/or post-exit content is generated based on the exit context. Exit content corresponds to content that is generated and provided to the web conferencing client of the participant before the web conferencing client's connection to the web conference is terminated. In some aspects, the exit content comprises an invitation to join a breakout session in which content regarding the web conference is provided to the participant. Post-exit content corresponds to content that is generated and provided to a user device of the participant after the web conferencing client's connection to the web conference has been terminated.

The exit content and/or post-exit content is generated such that it is context-aware based on the exit context. For instance, the exit content and/or post-exit content is generated in some aspects to provide a summary of content presented before the exit and/or a summary of conference content to be presented or actually presented after the exit. In some aspects, the exit content and/or post-exit content is generated by taking into account conference content of interest and/or topics of interest for the participant determined based on participant interactions of the participant and/or the user profile information for the participant. For instance, the participant interactions and/or user profile information for the participant could indicate an interest in a given topic, and the exit content and/or post-exit content is generated to provide a summary of conference content relevant to the topic. Beyond conference content summaries, the exit content and/or post-exit content can further tailor questionnaires, polls, and other types of content based on the exit context of the participant. For example, the exit and/or post-exit content could be portions of a recording (video or audio) from the web conference (before and/or after the participant's exit) determined to be relevant to the participant based on the participant's exit context.

Aspects of the technology described herein provide a number of improvements over existing technologies. For instance, exit and post-exit content is tailored to a given participant based on when the participant exited a web conference, how the participant interacted with the web conference when connected, and/or user profile information regarding the participant. This allows the participant to more quickly access content relevant to them. As a result, the technology described herein eliminators the need for the participant to watch an entire recording as in conventional approaches. The technology described herein also eliminates the need for the participant to jump around different portions of an interactive recording to find relevant content as in conventional approaches. As such, the technology described herein conserves computing resources required by conventional systems to play entire video recordings or to support continuous selections of interactive recordings by participants as they search for relevant content.

Example System for Web Conferencing Exit and Post-Exit Content Generation

With reference now to the drawings, FIG. 1 is a block diagram illustrating an exemplary system 100 for generating web conferencing exit and post-exit content based on an exit context of a web conference participant in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a participant device 102, a host device 104, and a web conferencing system 106. Each of the participant device 102, host device 104, and web conferencing system 106 shown in FIG. 1 can comprise one or more computer devices, such as the computing device 800 of FIG. 8, discussed below. As shown in FIG. 1, the participant device 102, the host device 104, and the web conferencing system 106 can communicate via a network 108, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the web conferencing system 106 could be provided by multiple server devices collectively providing the functionality of the web conferencing system 106 as described herein. Additionally, other components not shown can also be included within the network environment.

The participant device 102 and the host device 104 can be client devices on the client-side of operating environment 100, while the web conferencing system 106 can be on the server-side of operating environment 100. The web conferencing system 106 can comprise server-side software designed to work in conjunction with client-side software on the participant device 102 and the host device 104 so as to implement any combination of the features and functionalities discussed in the present disclosure. For instance, the participant device 102 can include a web conferencing client 110 for interacting with the web conferencing system 106, and the host device 104 can similarly include a web conferencing client 112 for interacting with the web conferencing system 106. The web conferencing clients 110, 112 can each be, for instance, a web browser or a dedicated application for connecting to a web conference and/or providing web conferencing functions, such as those described herein.

This division of operating environment 100 is provided to illustrate one example of a suitable environment, and there is no requirement for each implementation that any combination of the participant device 102, the host device 104, and the web conferencing system 106 remain as separate entities. While the operating environment 100 illustrates a configuration in a networked environment with a separate participant device 104, host device 106, and web conferencing system 106, it should be understood that other configurations can be employed in which components are combined. For instance, in some configurations, the participant device 102 and/or the host device 104 can also provide some or all of the capabilities of the web conferencing system 106 described herein. While the system 100 of FIG. 1 presents an example using a client-server environment, it should be understood that the technology described can be employed in peer-to-peer environments and/or other network configurations.

The participant device 102 comprises any type of computing device capable of use by a participant of a web conference, and the host device 104 comprises any type of device capable of use by a host participant of a web conference. For example, in one aspect, the participant device 104 and the host device 104 each comprises the type of computing device 800 described in relation to FIG. 8 herein. By way of example and not limitation, the participant device 102 and the host device 104 can each be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented.

A participant is associated with the participant device 102 and interacts with the web conferencing system 106 and/or the host device 104 using the participant device 102 via the web conferencing client 110. A host participant is associated with the host device 104 and interacts with the web conferencing system 106 and/or the participant device 102 using the host device 104 via the web conferencing client 112. Among other things, the web conferencing clients 110, 112 facilitate connecting the participant device 102 and the host device 104 to a web conference and presenting user interfaces for the web conference that facilitate the sharing of conference content and performance of participant interactions during a web conference. In some aspects, the web conferencing system 106 provides the web conferring client 112 for the host participant more privileges (e.g., the ability to share content) than that provided to the web conferencing client 110 for the participant. While the system 100 of FIG.

1 includes only a single participant device 102 and a single host device 104, it should be understood that the techniques described herein can be employed in environments with multiple participant devices and/or multiple host devices. Additionally, while the system 100 of FIG. 1 includes the host device 104, in some aspects, a web conference can be provided in which there are no host participants.

At a high level, the web conferencing system 106 facilitates web conferences among user devices, such as the participant device 102 and the host device 104, via web conferencing clients on the devices, such as the web conferencing client 110 and the web conferencing client 112. In accordance with some aspects of the technology described herein, the web conferencing system 106 determines an exit context of a participant's exit from a web conference and generates exit content and/or post-exit content based on the exit context, as will be described in further detail below.

As shown in FIG. 1, the web conferencing system 106 includes a conferencing component 114, a tracking component 116, an exit component 118, and a post-exit component 120. The components of the web conferencing system 106 can be in addition to other components that provide further additional functions beyond the features described herein. The web conferencing system 106 can be implemented using one or more server devices, one or more platforms with corresponding application programming interfaces, cloud infrastructure, and the like. While the web conferencing system 106 is shown separate from the participant device 102 and the host device 104 in the configuration of FIG. 1, it should be understood that in other configurations, some or all of the functions of the web conferencing system 106 can be provided on the participant device 102 and/or the host device 104.

In one aspect, the functions performed by components of the web conferencing system 106 are associated with one or more applications, services, or routines. In particular, such applications, services, or routines can operate on one or more user devices, servers, can be distributed across one or more user devices and servers, or be implemented in the cloud. Moreover, in some aspects, these components of the web conferencing system 106 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The conferencing component 114 of the web conferencing system 106 provides and manages web conferences among multiple devices, such as the participant device 102 and the host device 104, over the network 108. Among other things, the conferencing component 114 establishes connections of web conferencing clients, such as web conferencing client 110 and the web conferencing client 112, to web conferences. During a web conference, the conferencing component 114 manages live sharing of conference content, which can comprise a variety of multimedia content. For instance, the conferencing component 114 manages slide presentation content, videos, audio, polling, files, documents, chat (text, audio, video), screen sharing, whiteboarding, and other multimedia content distributed amongst web conferencing clients during web conferences. In some configurations, the conferencing component 114 further manages breakout sessions (i.e., breakout rooms), which allows for multiple virtual spaces among different subsets of participants and/or hosts within the context of a single web conference.

The tracking component 116 tracks conference content and participant interactions during a web conference and stores tracked data in the datastore 122. The tracked data can include conference content itself and/or metadata regarding the conference content and/or participant interactions during the web conference.

For a given web conference, the tracking component 116 establishes a timeline. For instance, a timeline can be based on the start of a web conference (i.e., the start of the web conference is the beginning of the timeline). During the web conference, the tracking component 116 tracks the sharing of conference content and participant interactions along the timeline. In some instances, this includes storing metadata associating timestamps identifying points in time along the timeline with the sharing of the conference content and participant interactions. For instance, each time a slide change occurs for a slide presentation, the tracking component 116 stores metadata identifying a timestamp for the slide change. When a file or document is shared, the tracking component 116 stores metadata identifying a timestamp for the file or document. When screen sharing or whiteboarding occurs, the tracking component 116 stores metadata associating a timestamp for the screen sharing or whiteboarding. When a poll occurs, the tracking component 116 stores metadata associating a timestamp with the poll. In some instances, multiple timestamps (e.g., a beginning timestamp and an ending timestamp) is tracked for certain conference content. For streaming content, such as audio, the tracking component 116 stores metadata correlating the streaming content with the timeline. For instance, an audio content for a web conference could have a timeline corresponding to the timeline of the web conference.

For each participant (including host participants), the tracking component 116 tracks participant interactions, including, for instance, connecting to the web conference, exiting the web conference, downloading files/documents/other content, sharing files/documents/other content, whiteboarding, selecting hyperlinks in conference content, submitting question, answering polls, chatting, reactions, applauding, entering a breakout session, engagement scores, and/or other interactions by the participant with conference content. For each participant interaction, the tracking component 116 stores metadata identifying a timestamp along the timeline for the participant interaction. The tracking component 116 can also store content associated with a participant interaction. For instance, the tracking component 116 could store chat text or a poll response entered by a participant.

In some aspects, the metadata for conference content and participant interactions includes various identifiers to identify various aspects of a web conference, the conference content, and the participant interactions. For instance, the identifiers can include a web conference identifier identifying the web conference, a breakout session identifier identifying a breakout session, a host identifier identifying a host, a participant identifier identifying a participant, a conference content identifier identifying particular conference content, and a participant interaction identifier identifying a particular participant interaction. For instance, the metadata for a poll taken during a web conference could be in the form: <conferenceID><pollID><timestamp>. As another example, the metadata for a participant exit from a web conference could be in the form: <conferenceID><participantID><exit><timestamp>. These metadata formats are provided by way of example only and not limitation. The metadata stored by the tracking component 116 can take other forms and include different information in accordance with various aspects of the technology described herein.

The exit component 118 generates a personalized exit experience, including the generation of exit content, for a participant at the time of receiving input from the participant's web conferencing client to exit the web conference but before the web conferencing client's connection to the web conference is terminated. The exit component 118 generates the exit experience based on an exit context for the participant. In some aspects, the exit context for a participant includes conference content consumed/not consumed by the participant (e.g., based on time of the exit), any interactions of the participant tracked by the tracking component 116 during the web conference prior to the exit, and/or user profile information for the participant. The exit content generated by the exit component 118 comprises, for instance, a summary of conference content consumed/not consumed by the participant, a summary of conference content of interest to the participant (e.g., based on participant interactions and/or user profile information for the participant), polls, questions, or any other content generated or otherwise tailored based on the exit context for the participant.

The time of exit is used by the exit component 118 to determine conference content that the participant consumed (e.g., presented via the participant's web conferencing client). In some aspects, the exit component 118 accesses tracked data for the web conference to determine the conference content presented to the point in time of the exit (i.e., the conference content consumed by the participant). For instance, if the conference content comprises a slide presentation, the exit component 118 determine which slides were viewed by the participant based on slide change timestamps that have occurred prior to the exit. If the participant joined the web conference after the web conference started (as indicated by a participant join timestamp in the tracked data), the exit component 118 determines the conference content presented between the participant join timestamp and the exit timestamp. In some configurations, some conference content, such as a slide presentation, is prepared prior to and associated with the web conference. In such configurations, the exit component 118 can determine conference content that has not yet been presented at the time of the exit. For instance, the exit component 118 can access slides of a slide presentation that have not been presented at the time of exit.

Participant interaction information in the tracked data is used by the exit component 118, in some instances, to determine what content was consumed by the participant. For instance, as noted above, a participant join timestamp can be used to identify when the participant joined and what conference content was presented since that time. Some participant interactions, such as downloading files, selecting hyperlinks, and chat interactions by the participant, identify additional content consumed by the participant. Some participant interactions are used by the exit component 118 to determine topics of interest to the participant. This could include conference content shared by the participant during the web conference (e.g., shared documents, chat entries, speaking, etc.). For instance, the exit component 118 can use natural language processing techniques to analyze chat text entered by the participant to identify a topic of interest of the participant based on the participant discussing that topic in the chat text. As another example, the exit component 118 can use natural language processing techniques to analyze portions of conference content the participant interacted with (e.g., entering an applause at a certain point of a presentation) to determine topics in those portions.

The exit component 118 can further employ user profile information for the participant when generating the exit experience. The user profile information comprises general information regarding the participant that can be useful in determining topics of interest to the participant. By way of example only, the user profile information could include demographic information (e.g., age, gender, location), job title, and company name. In some aspects, the exit component 118 employs the user profile information to personalize the exit content to the participant. For instance, suppose a web conference regarding an environmental topic is attended by both environmental scientists and lawyers. The exit component 118 could generate exit content that focuses on environmental aspects for an environmental scientist participant, while generating exit content that focuses on legal aspects for a lawyer participant.

The exit component 118 selects a type of exit experience and/or generates exit content based on the exit context for the participant (e.g., content consumed/not consumed at time of exit, participant interactions, user profile information). In some instances, the exit component 118 generates a message inviting the participant to a breakout session. By way of illustration, FIG. 2 provides a screen display 200 with a message 202 inviting the participant to join a breakout session before terminating the session. For example, the exit component 118 can determine to invite the participant to join a breakout session if the participant is leaving the web conference before some threshold period of time or if a sufficient amount of tracked data has not been collected for the participant to personalize the exit content. As shown in FIG. 2, a user interface element 204 is included that allows a participant to either join the breakout session or to decline and terminate the session (i.e., disconnect from the web conference).

If the participant selects to join the breakout session, the exit component 118 causes the participant's web conferencing client to join the breakout session, which could include that participant only. In instances in which the participant is leaving the web conference too quickly such that there is not enough tracked data for the participant to personalize the exit content, general exit content regarding the content of the web conference (which could be generated in advance) could be provided to the participant in the breakout session. In the breakout session, the participant is able to browse through the exit content (using asynchronous browse feature) or watch a video. A poll could be provided in the breakout session to obtain information regarding why the participant wants to leave the web conference early. The breakout session could also provide the ability for the participant to submit a question, in which case someone from the web conference host/presenter team can join that breakout session to answer questions orally or via text chat.

Further, the breakout session could provide options allowing the participant to rejoin the main web conference session or to terminate the session (i.e., disconnect from the web conference).

In some instances, the exit component 118 dynamically generates personalized (i.e., context-aware) exit content for the participant based on tracked data associated with the participant. The personalized exit content could be provided to the participant as part of a personalized breakout session or otherwise presented to the participant prior to the participant's web conferencing client being disconnected from the web conference. The exit component 118 generates exit content based on what conference content the participant has consumed (e.g., the conference content presented before the participant's selection to exit the web conference) and/or based on what conference content the participant has not consumed (e.g., the conference content to be presented after the participant's selection to exit the web conference). The exit component 118 can further generate the exit content based on participant interactions tracked by the tracking component 116 for the participant (indicative of subject matter of interest to the participant) and/or user profile information for the participant. In this way, the generated exit content is context-aware based on the conference content consumed, conference content not consumed, participant interactions for the participant, and/or user profile information for the participant.

By way of illustration, FIG. 3 provides a screen display 300 with exit content including exit content 302 based on conference content consumed by the participant and exit content 304 based on conference content not consumed by the participant. In particular, the exit content 302 in this example provides a summary of the conference content (e.g., identification of topics) presented to the point of time of the participant's selection to exit the web conference. In some configurations, each topic in the exit content 302 could comprise a hyperlink to obtain additional content relevant to each topic. The exit content 304 provides a summary of upcoming conference content for the web conference. Hyperlinks could be included in the exit content 304 to allow the participant to access additional information regarding the upcoming content. As also shown in FIG. 3, a user interface element 306 is provided that allows the participant to rejoin the web conference or to terminate the web conference session.

In some configurations, the exit component 118 dynamically generates personalized exit content for the participant using a template-based approach that dynamically selects and combines exit content portions prepared prior to the web conference based on the conference content of the web conference. For instance, an exit content portion could be generated for each slide in a slide presentation for the web conference. In such cases, the exit component 118 combines the pre-existing exit content portions for the slides presented before the participant selected to exit the web conference to generate exit content for consumed conference content, and/or the exit component 118 combines the pre-existing exit content portions for the slides not yet presented to generate exit content for conference content that has not been consumed by the participant. In some configurations, exit content portions are generated based on topics of the web conference. In such instances, topics of conference content consumed by the participant and/or not consumed by the participant are used to select certain exit topic portions to combine to generate the exit content. In some instances, the exit component 118 uses participant interactions in tracked data for the participant and/or user profile information to select exit content portions for generating the exit content for the participant. For instance, the exit component 118 identifies topics of interest to the participant based on the participant interactions and/or user profile information for the participant. The exit component 118 then selects exit content portions based on those identified topics and generates the exit content using the selected exit content portions.

In some configurations, the exit component 118 uses artificial intelligence to generate exit content based on the participant's exit context (i.e., conference content consumed/not consumed, participant interactions, and/or user profile information). For instance, the exit component 118 can include or otherwise employ a generator model (e.g., a generative adversarial network (GAN)-based generator model) to generate the exit content. A GAN comprises two neural networks—a generator network that generates content and a discriminator that attempts to distinguish between generated content (i.e., fake content) and real content. Once trained, the generator network is employed as a generator model to generate content. The generator model used by the exit component 118 could be, for instance, a text generator such as a generative pre-trained transformer (GPT)-based text generator. In such instances, the generator generates text for the exit content based on conference content consumed and/or not consumed. For instance, given the text from slides presented, presenter notes for those slides, and text from audio (e.g., from audio to text processing of spoken language during the web conference) corresponding to those slides could be provided as input to the text generator, which generates a summary of that text as the exit content. In some instances, the generator model generates a summary of conference content based on topics of interest for the participant identified from participant interactions and/or user profile information for the participant.

The post-exit component 120 generates a personalized post-exit experience, including the generation of post-exit content, for a participant after the participant's web conferencing client has disconnected from a web conference. The post-exit component 120 can generate the post-exit content after the participant's web conferencing client has disconnected either before the web conference has ended or after the web conference has ended (in which case the post-exit component 120 can leverage conference content generated during the web conference after the participant has exited, such as poll response). The post-exit content generated by the post-exit component 120 comprises, for instance, a summary of conference content consumed/not consumed by the participant, a summary of conference content of interest to the participant (e.g., based on participant interactions and/or user profile information for the participant), polls, questions, or any other content generated or otherwise tailored based on the exit context for the participant.

Similar to the exit component 118, the post-exist component 120 generates the post-exit content based on an exit context of the participant. In some aspects, the exit context includes conference content consumed/not consumed by the participant (based on a time of the exit), any interactions of the participant tracked by the tracking component 116 during the web conference prior to the exit, and/or user profile information for the participant. The post-exit component 120 generates the post-exit content using the exit context of the participant in a manner similar to that discussed above for the exit component 118. For instance, in some aspects, the post-exit component 120 generates post-exit content using a template-based approach in which pre-existing content portions are selected based on the exit context (i.e., content consumed/not consumed, participant interaction information, and/or user profile information for the participant) and combined to generate the post-exit content similar to the approach described above for the exit component 118. In some aspects, the post-exit component 120 employs a generator model to generate the post-exit content given the exit context for the participant similar to the approach described above for the exit component 118.

Example Methods for Web Conferencing Exit and Post-Exit Content Generation

Figure 4:
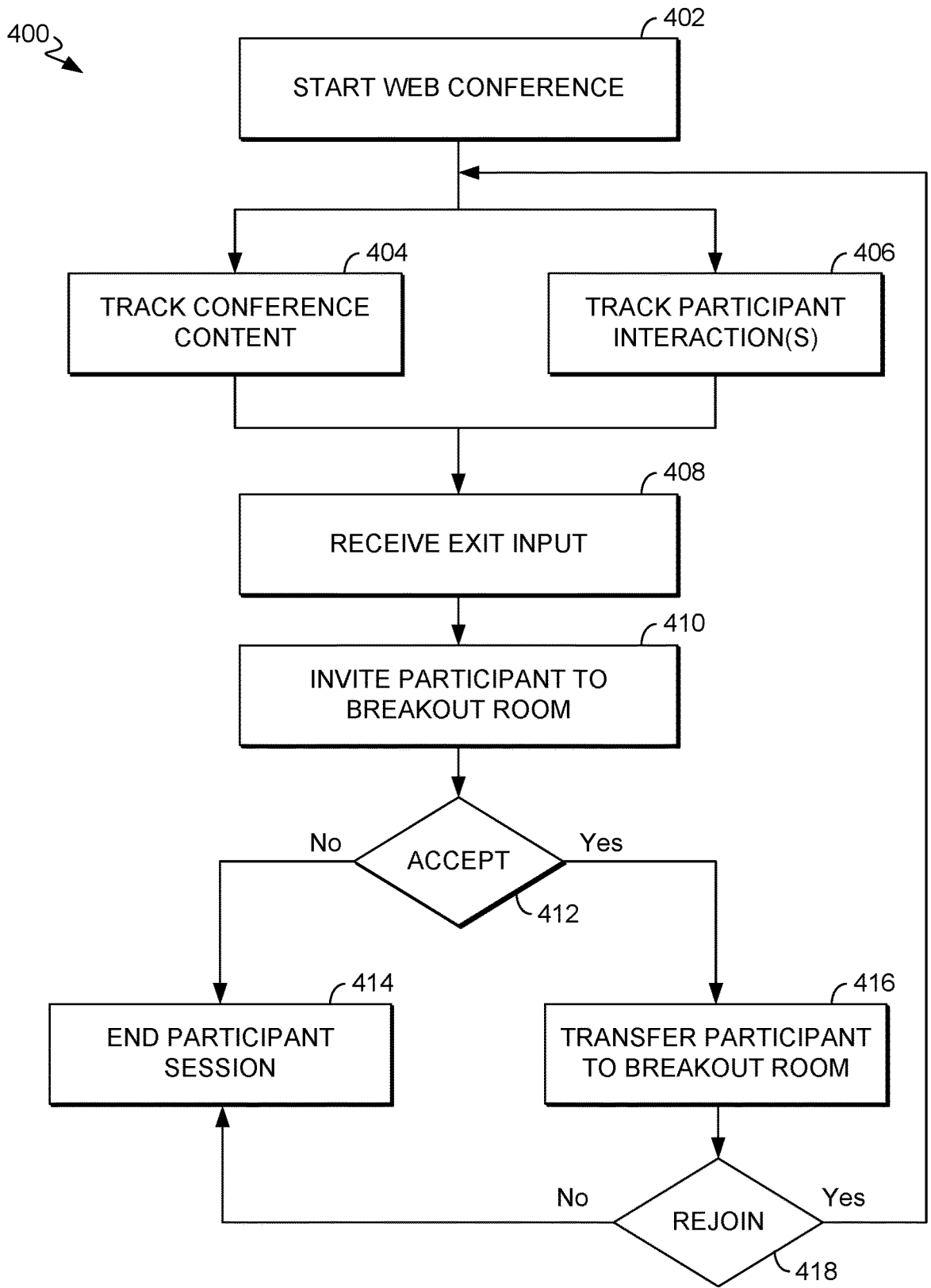
FIG. 4 is a flow diagram showing a method for providing a breakout session exit experience for a participant selecting to exit a web conference in accordance with some implementations of the present disclosure.

With reference now to FIG. 4, a flow diagram is provided that illustrates a method 400 for providing a breakout session exit experience for a participant selecting to exit a web conference. The method 400 can be performed, for instance, by the web conferencing system 106 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, a web conference is started by the web conferencing system connecting web conferencing clients of participant devices and/or host devices. During the web conference, conference content presented for the web conference is tracked, as shown at block 404. This can include, for instance, storing metadata for the conference content, such as timestamps of when portions of conference content are presented and one or more identifiers for the conference content, and/or storing conference content itself (e.g., a recording of the web conference, shared documents, poll responses, etc.). One or more participant interactions are also tracked during the web conference, as shown at block 406. This can include, for instance, storing metadata for each participant interaction, such as a timestamp of when each participant occurred and one or more identifiers for the participant interactions, and/or storing data associated with the participant interaction (e.g., shared document, chat entry, poll response, etc.).

During the web conference, exit input is received from a web conferencing client of a participant, as shown at block 408. The exit input can be based on, for instance, a user input to exit the web conference. In response to the exit input, as shown at block 410, a message is provided to the web conferencing client inviting the participant to connect to a breakout session associated with the web conference. In some aspects, the system determines to provide the invitation to the breakout session based on the exit input being received before a threshold period of time has passed for the web conference and/or based on not receiving a threshold level of participant interactions.

A determination is made at block 412 regarding whether the invitation to the breakout session is accepted by the participant. For instance, the message can include a user interface element allowing the participant to select to either join the breakout session or disconnect from the web conference. If the participant selects to disconnect, the participant session is terminated (e.g., disconnecting the participant's web conferencing from the web conference), as shown at block 414. Alternatively, if the participant selects to join the breakout session, the participant's web conferencing client is transferred to the breakout session, as shown at block 416, at which exit content is provided for presentation. The exit content provided in the breakout session can include generic content (i.e., based on conference content but not an exit context of the participant) and/or personalized content generated based on an exit content of the participant (e.g., exit time, participant interactions, and/or user profile information for the participant). In the breakout session, an option to rejoin the web conference or to disconnect from the web conference is provided, as shown at block 418. The participant can select to disconnect from the web conference (in which case the participant's web conferencing client is disconnected at block 414) or rejoin the web conference (in which case the participant's web conferencing client is transferred back to the main web conference session).

Figure 5:
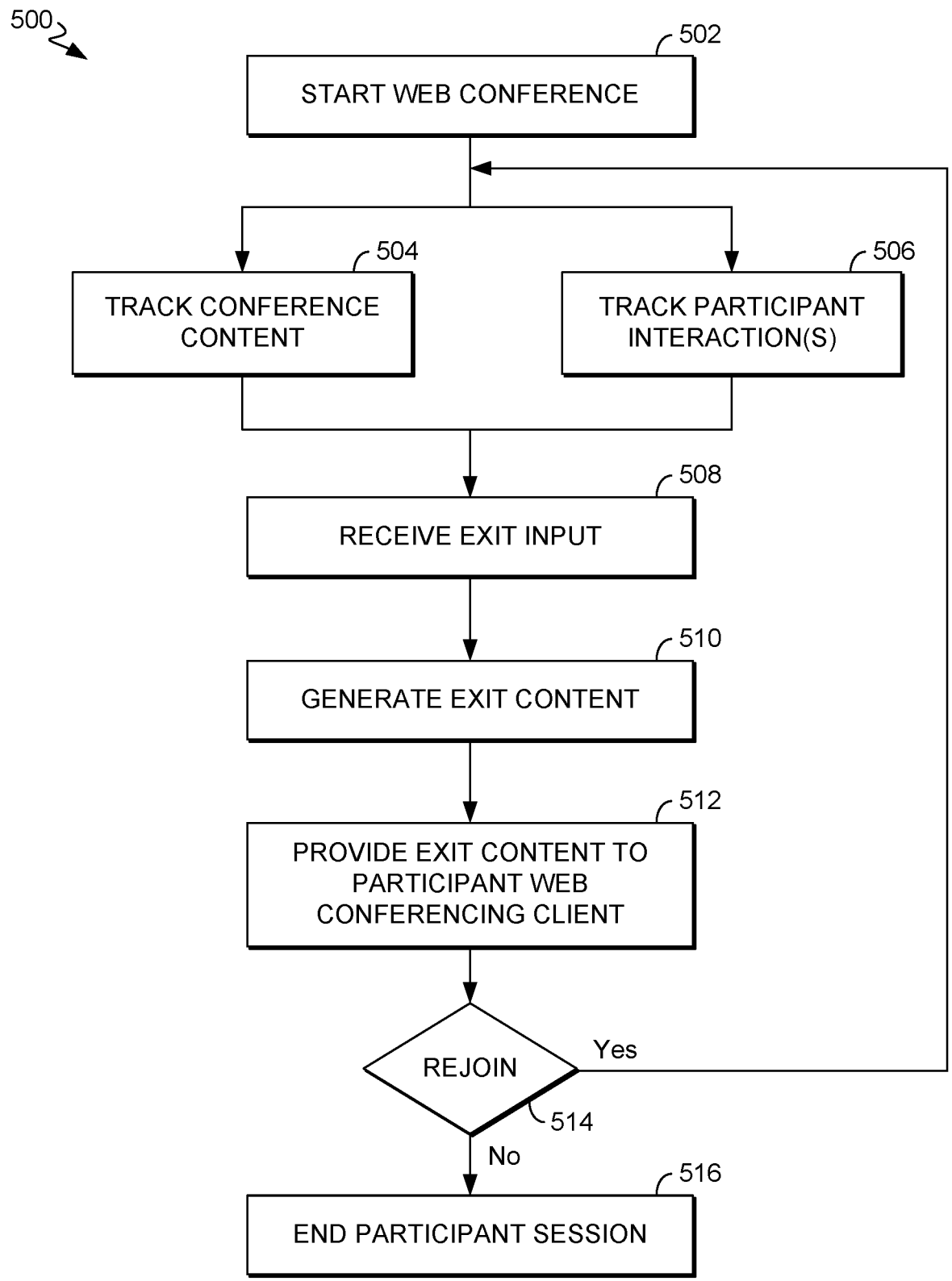
FIG. 5 is a flow diagram showing a method for generating exit content based on an exit context of a participant in accordance with some implementations of the present disclosure.

Turning next to FIG. 5, a flow diagram is provided showing a method 500 for generating exit content based on an exit context of a participant. The method 500 can be performed, for instance, by the web conferencing system 106 of FIG. 1.

As shown at block 502, a web conference is started by the web conferencing system connecting web conferencing clients of participant devices and/or host devices. During the web conference, conference content presented for the web conference is tracked, as shown at block 504. This can include, for instance, storing metadata for the conference content, such as timestamps of when portions of conference content are presented and one or more identifiers for the conference content, and/or storing conference content itself (e.g., a recording of the web conference, shared documents, poll responses, etc.). One or more participant interactions are also tracked during the web conference, as shown at block 506. This can include, for instance, storing metadata for each participant interaction, such as a timestamp of when each participant occurred and one or more identifiers for the participant interactions, and/or storing data associated with the participant interaction (e.g., shared document, chat entry, poll response, etc.).

During the web conference, exit input is received from a web conferencing client of a participant, as shown at block 508. The exit input can be based on, for instance, a user input to exit the web conference. In response to the exit input, as shown at block 510, exit content is generated based on an exit context for the participant. The exit context can be based on an exit time, one or more participant interactions, and/or user profile information for the participant. For instance, the exit time can be used to determine conference content presented and/or conference content not presented before the exit time. The one or more participant interactions and/or user profile information can be used to determine conference content and/or topics of interest to the participant. As shown at block 512, the exit content is provided for presentation via the participant's web conferencing client.

An option to rejoin the web conference or to disconnect from the web conference is provided to the participant's web conferencing client, and a selection is received as shown at block 514. The participant can select to disconnect from the web conference (in which case the participant's web conferencing client is disconnected at block 516) or rejoin the web conference (in which case the participant's web conferencing client is transferred back to the main web conference session).

Figure 6:
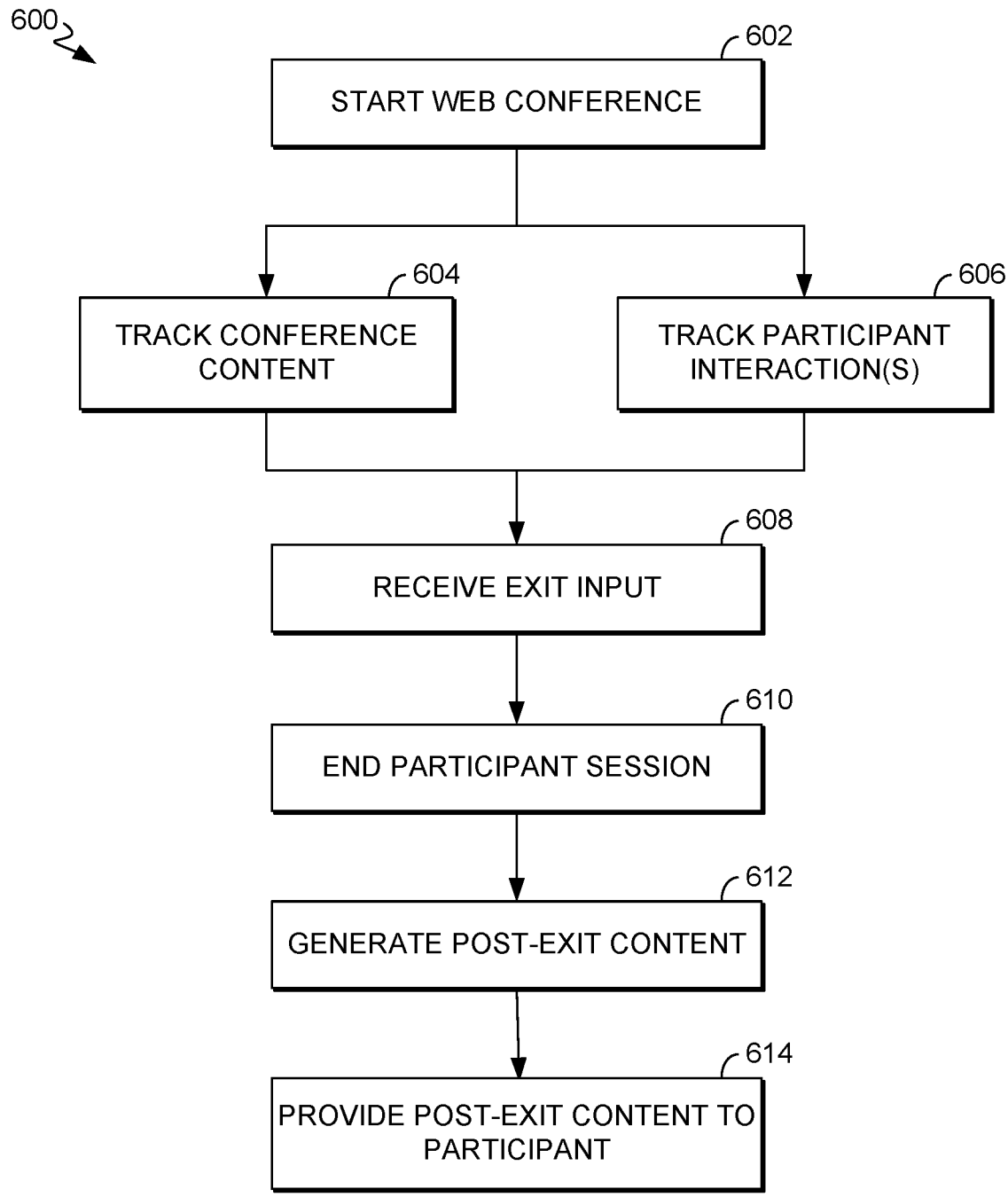
FIG. 6 is a flow diagram showing a method for generating post-exit content based on an exit context of a participant in accordance with some implementations of the present disclosure.

FIG. 6 is a flow diagram showing a method 600 for generating post-exit content based on an exit context of a participant. The method 600 can be performed, for instance, by the web conferencing system 106 of FIG. 1.

As shown at block 602, a web conference is started by the web conferencing system connecting web conferencing clients of participant devices and/or host devices. During the web conference, conference content presented for the web conference is tracked, as shown at block 604. This can include, for instance, storing metadata for the conference content, such as timestamps of when portions of conference content are presented and one or more identifiers for the conference content, and/or storing conference content itself (e.g., a recording of the web conference, shared documents, poll responses, etc.). One or more participant interactions are also tracked during the web conference, as shown at block 606. This can include, for instance, storing metadata for each participant interaction, such as a timestamp of when each participant occurred and one or more identifiers for the participant interactions, and/or storing data associated with the participant interaction (e.g., shared document, chat entry, poll response, etc.).

During the web conference, exit input is received from a web conferencing client of a participant, as shown at block 608. The exit input can be based on, for instance, a user input to exit the web conference. In some cases, the exit input is based on a termination of the web conference. The participant's web conferencing client is disconnected from the web conference, as shown at block 610.

Post-exit content is generated based on an exit context for the participant, as shown at block 612. The post-exit context can be based on an exit time, one or more participant interactions, and/or user profile information for the participant. For instance, the exit time can be used to determine conference content presented and/or conference content not presented before the exit time. The one or more participant interactions and/or user profile information can be used to determine conference content and/or topics of interest to the participant. As shown at block 614, the post-exit content is provided to the participant for presentation via a client device of the participant.

Figure 7:
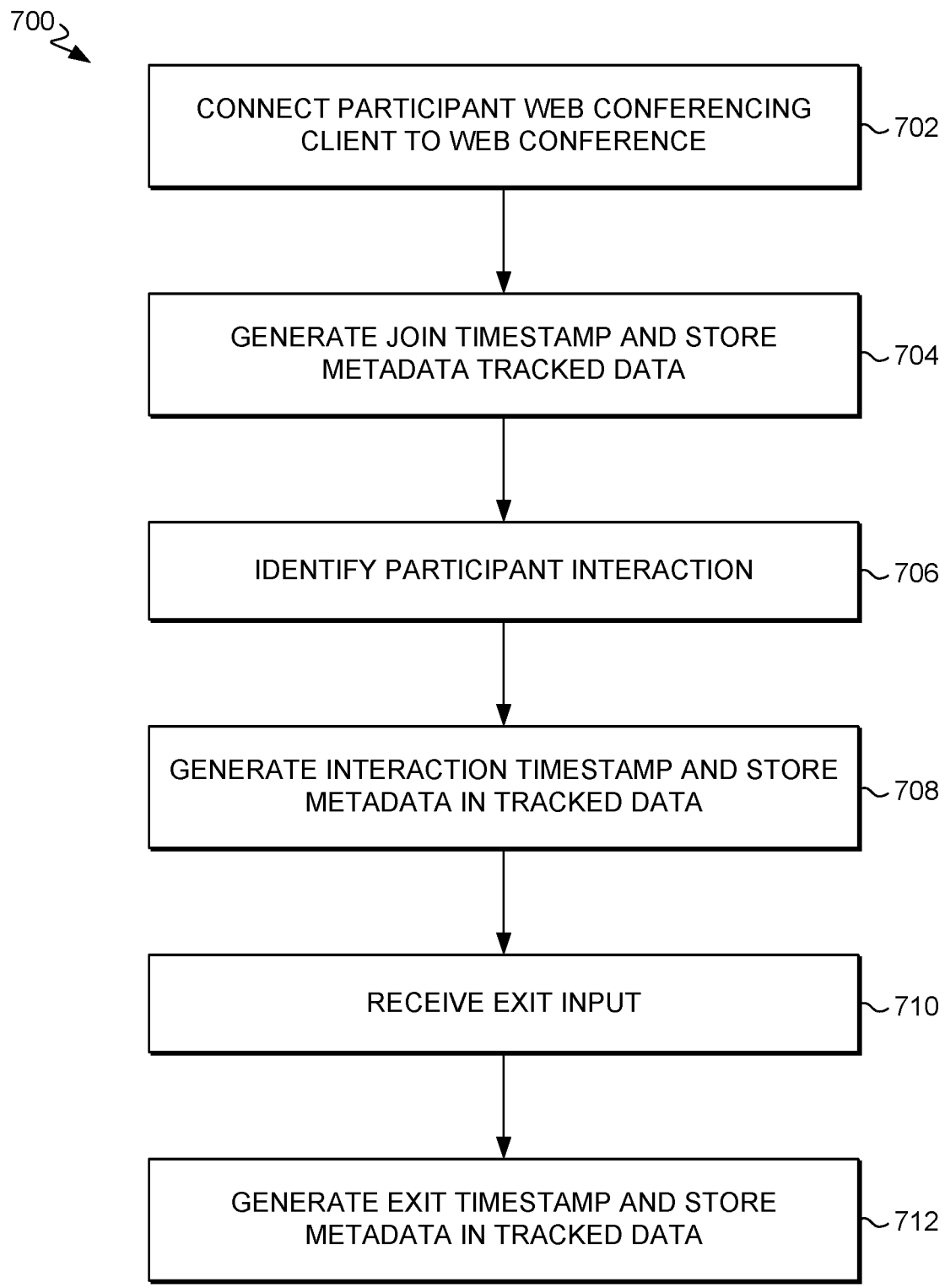
FIG. 7 is a flow diagram showing a method for tracking data for participant interactions during a web conference in accordance with some implementations of the present disclosure.

With reference now to FIG. 7, a flow diagram is provided showing a method 700 for tracking data for participant interactions during a web conference. The method 700 can be performed, for instance, by the tracking component 116 of the web conferencing system 106 of FIG. 1.

As shown at block 702, a web conferring client of a participant is connected to a web conference. A conference join timestamp is generated and metadata is stored in tracked data for the web conference, as shown at block 704. The conference join timestamp indicates a point in time along the timeline for the web conference at which the web conferencing client connected to the web conference (this could be a start time of the web conference in some cases or a later time after the start of the web conference in other cases). In some aspects, the metadata stored at block 704 comprises the conference join timestamp and one or more identifiers (e.g., identifying the web conference, identifying the participant, identifying the participant interaction as joining the web conference).

After the participant's web conferencing client has been connected to the web conference, a participant interaction is identified, as shown at block 706. A participant interaction timestamp is generated and metadata is stored in tracked data for the web conference, as shown at block 708. The participant interaction timestamp indicates a point in time along the timeline for the web conference at which the participant interaction occurred. In some aspects, the metadata stored at block 708 comprises the participant interaction timestamp and one or more identifiers (e.g., identifying the web conference, identifying the participant, identifying the participant interaction as a particular type of interaction). In some instances, content associated with the participant interaction (e.g., a shared document, chat entry, poll response, etc.) and/or information regarding the content is also stored. Although FIG. 7 shows only a single participant interaction at block 706 and storage of data at block 708, it should be understood that multiple participant interactions can be identified and data stored for a participant during the web conference.

As shown at block 710, an exit input is received. For instance, the participant can select an option to exit the web conference. A conference exit timestamp is generated and metadata is stored in tracked data for the web conference, as shown at block 712. The conference exit timestamp indicates a point in time along the timeline for the web conference at which the exit input is received, the web conferencing client is disconnected from the web conference, or other time associated with an exit (e.g., a termination of the web conference). In some aspects, the metadata stored at block 712 comprises the conference exit timestamp and one or more identifiers (e.g., identifying the web conference, identifying the participant, identifying the participant interaction as exiting the web conference).

Exemplary Operating Environment

Figure 8:
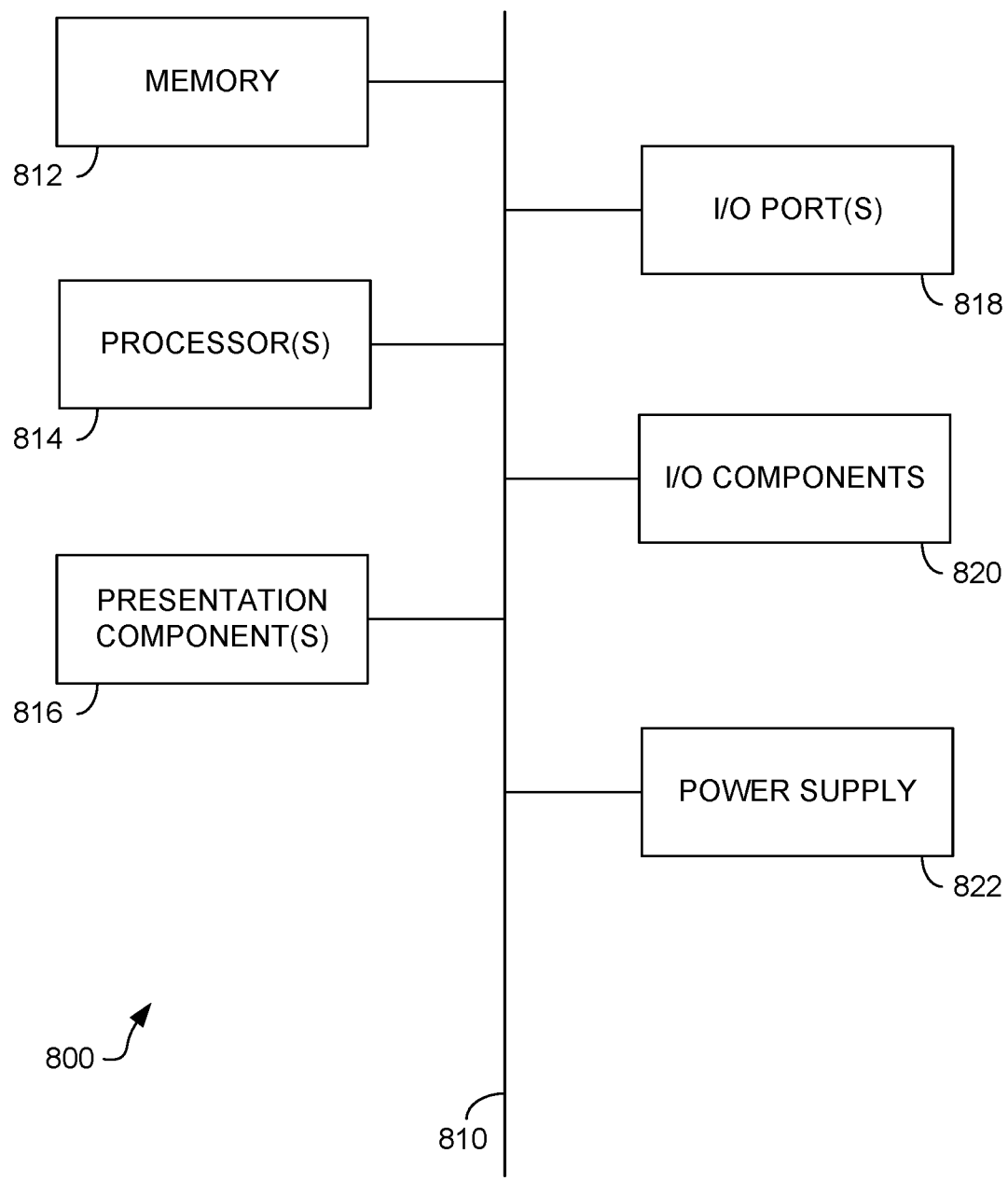
FIG. 8 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 8 in particular, an exemplary operating environment for implementing embodiments of the present technology is shown and designated generally as computing device 800. Computing device 800 is but one example of a suitable computing environment and is not intended to suggest any limitation as to the scope of use or functionality of the technology. Neither should the computing device 800 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what can be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory can be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which can be built in. Illustrative components include a microphone, joystick, game pad, satellite dish, scanner, printer, wireless device, etc. The I/O components 820 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 can be equipped with depth cameras, such as, stereoscopic camera systems, infrared camera systems, RGB camera systems, and combinations of these for gesture detection and recognition. Additionally, the computing device 800 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
    storing, during presentation of conference content for a web conference, metadata regarding one or more participant interactions by a participant with one or more displayed portions of the conference content presented during the web conference via a web conferencing client on a user device of the participant, each of the one or more participant interactions comprising a user input provided by the participant via a user interface of the web conferencing client to interact with the one or more displayed portions of the conference content, the metadata for each participant interaction including a timestamp for the participant interaction;
    receiving input indicative of the participant selecting to terminate a connection of the web conferencing client of the participant before the web conference has concluded; and
    responsive to receiving the input indicative of the participant selecting to terminate the connection of the web conferencing client of the participant before the web conference has concluded, and before terminating the connection of the web conferencing client to a web conferencing server:
        determining an exit context based at least in part on the metadata regarding the one or more participant interactions,
        selecting a type of exit experience based on the exit context,
        generating exit content based on the selected type of exit experience,
        providing the exit content for presentation on the user device, wherein the web conferencing client on the user device presents the exit content, and
        responsive to a second input indicative of the participant selecting to rejoin the web conference, transferring the web conferencing client of the participant back to the web conference.

2. The one or more computer storage media of claim 1, wherein the metadata regarding the one or more participant interactions comprises one or more selected from the following: a portion of the conference content presented via the web conferencing client, a hyperlink selected from the conference content for the web conference, a question submitted during the web conference, a poll answer submitted during the web conference, chat content entered during the web conference, and a breakout session attended during the web conference.

3. The one or more computer storage media of claim 1, wherein the metadata regarding the one or more participant interactions comprises a first timestamp for a first participant interaction indicating a point in time along a timeline for the web conference of the first participant interaction.

4. The one or more computer storage media of claim 1, wherein the exit context comprises an exit timestamp indicating a point in time along a timeline for the web conference of the exit.

5. The one or more computer storage media of claim 4, wherein the exit context is based in part on a portion of the conference content presented determined based on the exit timestamp.

6. The one or more computer storage media of claim 1, wherein the exit content is further generated based on user profile information for the participant.

7. The one or more computer storage media of claim 1, wherein the exit experience comprises an invitation to join a breakout session of the web conference, and wherein the operations further comprise:
    responsive to receiving input accepting the invitation, connecting the web conferencing client to the breakout session of the web conference, wherein the exit content is presented in the breakout session.

8. A computer-implemented method comprising:
    storing, by a tracking component, metadata regarding one or more participant interactions by a participant with one or more displayed portions of conference content presented during a web conference via a web conferencing client on a participant device of the participant, each of the one or more participant interactions comprising a user input provided by the participant via a user interface of the web conferencing client to interact with the one or more displayed portions of the conference content, the metadata for each participant interaction including a timestamp for the participant interaction;
    receiving, by an exit component, an exit request for the web conferencing client of the participant to disconnect from the web conference;
    responsive to the exist request, and before disconnecting the web conferencing client from a web conferencing server:
        determining an exit context based at least in part on the metadata regarding the one or more participant interactions,
        selecting a type of exit experience based on the exit context, generating exit content based on the selected type of exit experience, providing the exit content for presentation on the user device,
    wherein the web conferencing client on the user device presents the exit content, and
        responsive to an input indicative of the participant selecting to rejoin the web conference, transferring the web conferencing client of the participant back to the web conference.

9. The computer-implemented method of claim 8, wherein the exit context is further determined based on an exit time associated with the exit request.

10. The computer-implemented method of claim 9, wherein the exit context is further based on conference content presented before the exit time.

11. The computer-implemented method of claim 9, wherein the exit content is further based on conference content not presented before the exit time.

12. The computer-implemented method of claim 8, wherein the exit experience comprises an invitation to join a breakout session of the web conference, and wherein the operations further comprise:
responsive to receiving input accepting the invitation, connecting the web conferencing client to the breakout session of the web conference, wherein the exit content is presented in the breakout session.

13. A computer system comprising:
one or more processors; and
one or more computer storage media storing computer-useable instructions that, when used by the one or more processors, causes the one or more processors to perform operations comprising:
storing, by a tracking component, metadata regarding one or more participant interactions by a participant with one or more displayed portions of conference content presented during a web conference via a web conferencing client on a user device of the participant connected to the web conference over a network, each of the one or more participant interactions comprising a user input provided by the participant via a user interface of the web conferencing client to interact with the one or more displayed portions of the conference content, the metadata for each participant interaction including a timestamp for the participant interaction;
receiving, by an exit component, an exit request for the web conferencing client of the participant to disconnect from the web conference;
storing, by the tracking component, an exit timestamp indicating a point in time along a timeline of the web conference at which the exit request was received;
responsive to the exist request, and before disconnecting the web conferencing client from a web conferencing server:
determining an exit context based at least in part on the metadata regarding the one or more participant interactions and the exit timestamp,
selecting a type of exit experience based on the exit context, generating exit content based on the selected type of exit experience, providing the exit content for presentation on the user device,
wherein the web conferencing client on the user device presents the exit content, and
responsive to an input indicative of the participant selecting to rejoin the web conference, transferring the web conferencing client of the participant back to the web conference.

14. The computer system of claim 13, wherein determining the exit context comprises determining conference content presented via the web conferencing client based on the exit timestamp.

15. The computer system of claim 13, wherein determining the exit context comprises determining conference content not presented via the web conferencing client based on the exit timestamp.

16. The computer system of claim 13, wherein determining the exit context comprises determining the exit context based in part on user profile information for the participant.

\* \* \* \* \*